US012118956B2

(12) United States Patent
Huang

(10) Patent No.: US 12,118,956 B2
(45) Date of Patent: Oct. 15, 2024

(54) DISPLAY PANEL CONTROL METHOD AND DISPLAY MODULE

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventor: Ruiming Huang, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/758,977

(22) PCT Filed: Jun. 16, 2022

(86) PCT No.: PCT/CN2022/099158
§ 371 (c)(1),
(2) Date: Jul. 17, 2022

(87) PCT Pub. No.: WO2023/226110
PCT Pub. Date: Nov. 30, 2023

(65) Prior Publication Data

US 2024/0194162 A1 Jun. 13, 2024

(30) Foreign Application Priority Data

May 26, 2022 (CN) ......................... 202210586974.7

(51) Int. Cl.
*G09G 3/36* (2006.01)

(52) U.S. Cl.
CPC ... *G09G 3/3696* (2013.01); *G09G 2300/0852* (2013.01); *G09G 2320/0219* (2013.01);
(Continued)

(58) Field of Classification Search
CPC ......... G09G 3/3696; G09G 2300/0852; G09G 2320/0219; G09G 2320/0247; G09G 2320/0257; G09G 2330/021
See application file for complete search history.

(56) References Cited

U.S. PATENT DOCUMENTS 7,557,872 B2 * 7/2009 Wu .................. G02F 1/136213 349/39
2001/0005247 A1 * 6/2001 Kikkawa ............... G02F 1/1395 349/139
(Continued)

FOREIGN PATENT DOCUMENTS

CN 1987620 A 6/2007
CN 101315504 A 12/2008
(Continued)

OTHER PUBLICATIONS

Kang, Translation of CN 105446035, May 14, 2019 (Year: 2019).*
(Continued)

*Primary Examiner* — Dmitriy Bolotin
(74) *Attorney, Agent, or Firm* — PV IP PC; Wei Te Chung

(57) ABSTRACT

The present application provides a display panel control method and a display module. A display voltage corresponding to corresponding pixel unit can be compensated for based on a difference between a first feed-through voltage generated by a pixel electrode when a first transistor is turned from on to off and a second feed-through voltage generated by a common electrode when a second transistor is turned from on to off, so as to improve the problem such as the flicker or the image sticking in the display picture due to the unevenness of the feed-through voltages.

16 Claims, 4 Drawing Sheets

(52) U.S. Cl.
CPC ............... *G09G 2320/0247* (2013.01); *G09G 2320/0257* (2013.01); *G09G 2330/021* (2013.01)

(56) References Cited

U.S. PATENT DOCUMENTS

| | | | | |
|---|---|---|---|---|
| 2003/0016310 | A1* | 1/2003 | Lee | G02F 1/136213 349/43 |
| 2004/0164942 | A1* | 8/2004 | Shih | G09G 3/3648 345/90 |
| 2006/0132415 | A1* | 6/2006 | Yu | G09G 3/3655 345/98 |
| 2007/0126684 | A1* | 6/2007 | Chang | G11C 19/28 345/94 |
| 2007/0187686 | A1* | 8/2007 | Liu | H01L 27/124 257/72 |
| 2007/0279360 | A1* | 12/2007 | Park | G09G 3/3696 345/94 |
| 2007/0285369 | A1* | 12/2007 | Park | G09G 3/3659 345/90 |
| 2007/0291191 | A1* | 12/2007 | Liu | G09G 3/3655 349/38 |
| 2008/0023717 | A1* | 1/2008 | Choi | H10K 59/126 257/E27.113 |
| 2008/0136764 | A1* | 6/2008 | Kim | G09G 3/3655 345/92 |
| 2009/0174831 | A1* | 7/2009 | Chien | G09G 3/3648 349/39 |
| 2009/0237393 | A1* | 9/2009 | Saito | G09G 3/344 345/107 |
| 2010/0309190 | A1* | 12/2010 | Hasegawa | G02F 1/13306 345/212 |
| 2010/0328563 | A1* | 12/2010 | Chang | G02F 1/136213 349/39 |
| 2011/0007060 | A1* | 1/2011 | Jarupoonphol | G09G 3/3655 345/212 |
| 2012/0176388 | A1* | 7/2012 | Yokoyama | G09G 3/3648 345/531 |
| 2014/0354621 | A1 | 12/2014 | Shin | |
| 2015/0179114 | A1* | 6/2015 | Dong | G02F 1/1365 345/88 |
| 2015/0255491 | A1* | 9/2015 | Uchida | G02F 1/136277 257/43 |
| 2016/0085116 | A1* | 3/2016 | Iwatsu | G02F 1/136286 349/144 |
| 2017/0125506 | A1* | 5/2017 | Kim | G09G 3/3225 |
| 2019/0094605 | A1* | 3/2019 | Wang | G02F 1/13452 |
| 2019/0206355 | A1 | 7/2019 | Morii | |
| 2021/0118379 | A1* | 4/2021 | Lu | G09G 3/3688 |

FOREIGN PATENT DOCUMENTS

| | | | |
|---|---|---|---|
| CN | 101520583 | A | 9/2009 |
| CN | 101634786 | A | 1/2010 |
| CN | 102023423 | A | 4/2011 |
| CN | 102402958 | A | 4/2012 |
| CN | 102608817 | A | 7/2012 |
| CN | 103295540 | A | 9/2013 |
| CN | 103760726 | A | 4/2014 |
| CN | 104460166 | A | 3/2015 |
| CN | 105446035 | A | 3/2016 |
| CN | 105448255 | A | 3/2016 |
| CN | 105629609 | A | 6/2016 |
| CN | 105633093 | A | 6/2016 |
| CN | 106647080 | A | 5/2017 |
| CN | 106847226 | A | 6/2017 |
| CN | 107463035 | A | 12/2017 |
| JP | 2001033758 | A | 2/2001 |
| TW | 200725536 | A | 7/2007 |

OTHER PUBLICATIONS

International Search Report in International application No. PCT/CN2022/099158, mailed on Dec. 16, 2022.

Written Opinion of the International Search Authority in International application No. PCT/CN2022/099158, mailed on Dec. 16, 2022.

Chinese Office Action issued in corresponding Chinese Patent Application No. 202210586974.7 dated Dec. 27, 2022, pp. 1-6.

* cited by examiner

DISPLAY PANEL CONTROL METHOD AND DISPLAY MODULE

TECHNICAL FIELD

The present application relates to a display technology field, and in particular to a display panel control method, a display module, and a display device.

BACKGROUND

When a liquid crystal display panel employing an in-plane switching technique performs a picture switching operation, a voltage applied to liquid crystal molecules is not changed in time to the voltage required for displaying a current picture, which is extremely likely to cause an image residual phenomenon on the display panel. Although the image residual phenomenon due to the voltage applied to the liquid crystal molecules being not changed in time can be improved by a capacitance compensation voltage connected in series between a gate and a source of a driving transistor, when the driving transistor is changed from an on state to an off state, a pixel voltage is changed due to a capacitance coupling effect. As a result, the capacitance compensation voltage connected in series between the gate and the source of the driving transistor cannot improve a problem such as a flicker or an image sticking due to unevenness of feed-through voltages.

TECNICAL PROBLEM

Embodiments of the present application provide a display panel control method, a display module, and a display device, so as to improve the problem such as the flicker or the image sticking in the display picture due to the unevenness of the feed-through voltages.

TECHNICAL SOLUTIONS TO THE PROBLEMS

An embodiment of the present application provides a display panel control method. The display panel comprises a plurality of data lines, a plurality of common lines, and a plurality of pixel units, wherein each of the pixel units comprises a first transistor, a second transistor, a pixel electrode, and a common electrode, wherein a source and a drain of the first transistor are electrically connected between the pixel electrode and the data line, and a source and a drain of the second transistor are electrically connected between the common electrode and the common line; the pixel electrode generates a first feed-through voltage when the first transistor is changed from an on state to an off state; and the common electrode generates a second feed-through voltage when the second transistor is changed from the on state to the off state. The control method comprises compensating for a display voltage corresponding to each of the plurality of pixel units based on a difference between the first feed-through voltage and the second feed-through voltage of the pixel unit.

Optionally, in some embodiments of the present application, said compensating for a display voltage corresponding to each of the plurality of pixel units based on a difference between the first feed-through voltage and the second feed-through voltage of the pixel unit comprises compensating for a data voltage transmitted by the data line or a common voltage transmitted by the common line corresponding to each of the plurality of pixel units based on each of a plurality of first differences between the first feed-through voltage and the second feed-through voltage of each of the plurality of pixel units.

Optionally, in some embodiments of the present application, before compensating for a data voltage transmitted by the data line or a common voltage transmitted by the common line corresponding to each of the plurality of pixel units based on each of a plurality of first differences between the first feed-through voltage and the second feed-through voltage of each of the plurality of pixel units, the control method further comprises:

- acquiring the first feed-through voltages and the second feed-through voltages corresponding to the plurality of pixel units; and
- calculating the plurality of first differences between the first feed-through voltages and the second feed-through voltages of the plurality of pixel units.

Optionally, in some embodiments of the present application, a calculation formula of the first feed-through voltage is: $V_{FT1}=C_{GD1}/(C_{lc}+C_{st}+C_{GD1}+C_{su})*\Delta V_{G1}$;

- a calculation formula of the second feed-through voltage is: $V_{FT2}=C_{GD2}/(C_{lc}+C_{st}+C_{GD2}+C_{su})*\Delta V_{G2}$;
- a calculation formula of the first difference is: $X=V_{FT1}-V_{FT2}$;
- wherein $C_{GD1}$ represents a parasitic capacitance between a scanning line electrically connected to the first transistor and the pixel electrode, and $C_{GD2}$ represents a parasitic capacitance between a scanning line electrically connected to the second transistor and the common electrode; $\Delta V_{G1}$ represents a voltage change amount on the scanning line electrically connected to the first transistor, and $\Delta V_{G2}$ represents a voltage change amount on the scanning line electrically connected to the second transistor; and $C_{su}$ represents a sum of remaining of a plurality of parasitic capacitance generated between any two of the pixel electrode, the data line, the common line, the scanning line, and the common electrode other than $C_{GD1}$ and $C_{GD2}$.

An embodiment of the present application provide a display module, comprising a display panel and a driving module electrically connected to the display panel. The display panel comprises a plurality of data lines, a plurality of common lines, and a plurality of pixel units.

Each of the pixel units comprises a first transistor, a second transistor, a pixel electrode, and a common electrode. A source and a drain of the first transistor are electrically connected between the pixel electrode and the data line, and a source and a drain of the second transistor are electrically connected between the common electrode and the common line. The pixel electrode generates a first feed-through voltage when the first transistor is changed from an on state to an off state. The common electrode generates a second feed-through voltage when the second transistor is changed from the on state to the off state. The driving module is electrically connected to the plurality of data lines and the plurality of common lines, and configured to compensate for a display voltage corresponding to each of the plurality of pixel units based on a difference between the first feed-through voltage and the second feed-through voltage of the pixel unit.

Optionally, in some embodiments of the present application, a first difference exists between the first feed-through voltage and the second feed-through voltage, and the driving module compensates for the display voltage corresponding to each of the plurality of pixel units based on the first difference of the pixel unit.

Optionally, in some embodiments of the present application, the driving module comprises a timing controller and a power management chip electrically connected to the timing controller, wherein the timing controller compensates for an output signal of the power management chip based on the first difference to compensate for the display voltage corresponding to respective pixel unit of the plurality of pixel units.

Optionally, in some embodiments of the present application, the display voltage comprises a data voltage, and the driving module further comprises a source driving chip electrically connected to both the power management chip and the plurality of data lines, wherein the source driving chip outputs a plurality of data voltage to the plurality of data lines based on the output signal of the power management chip.

Optionally, in some embodiments of the present application, a gray scale level corresponding to the display voltage before compensation is inversely proportional to the first difference.

Optionally, in some embodiments of the present application, each of the pixel units has a plurality of first difference when being corresponding to a plurality of gray scale levels, and the number of the first difference having different values is less than or equal to the number of gray scale levels of the display panel.

Optionally, in some embodiments of the present application, the display voltage comprises a common voltage, and the plurality of common lines are electrically connected to the power management chip, wherein the power management chip outputs a common voltage to each of the plurality of common lines.

Optionally, in some embodiments of the present application, the plurality of pixel units have a plurality of first difference when being corresponding to a plurality of gray scale levels, and the plurality of first difference have a first maximum difference and a first minimum difference. The common voltage is equal to an average of the first maximum difference and the first minimum difference.

Optionally, in some embodiments of the present application, the pixel unit further comprises a liquid crystal capacitor, a storage capacitor, and a liquid crystal layer, wherein the liquid crystal capacitor is constituted by the pixel electrode, the common electrode, and the liquid crystal layer; the storage capacitor is connected in parallel with the liquid crystal capacitor, and the storage capacitor is connected in series between one of a source and a drain of the first transistor electrically connected to the pixel electrode and one of a source and a drain of the second transistor electrically connected to the common electrode.

Optionally, in some embodiments of the present application, both electrodes of the storage capacitor are constituted by a second common line and the pixel electrode, respectively.

Optionally, in some embodiments of the present application, the plurality of common lines comprise a plurality of first common lines and a plurality of second common lines, wherein the plurality of first common lines are disposed in parallel with and spaced apart from the scanning lines, and the plurality of second common lines are disposed in parallel with and spaced apart from the data lines.

Optionally, in some embodiments of the present application, the pixel unit further comprises a first capacitor and a second capacitor, wherein the first capacitor is connected in series between one of a source or a drain of the first transistor electrically connected to the pixel electrode and a first voltage terminal, and the second capacitor is connected in series between one of a source or a drain of the second transistor electrically connected to the common electrode and the first voltage terminal.

Optionally, in some embodiments of the present application, the display panel further comprises a plurality of scanning lines, wherein a gate of the first transistor and a gate of the second transistor of the same pixel unit are electrically connected to the same scanning line.

Optionally, in some embodiments of the present application, the timing controller comprises a storage module configured to store a plurality of first difference.

An embodiment of the present application provides a display device comprising the display module according to any one of the foregoing embodiments.

BENEFICIAL EFFECTS

In comparison with the prior art, embodiments of the present application provide the display panel control method, the display module, and the display device, wherein the display panel comprises the plurality of data lines, the plurality of common lines, and the plurality of pixel units, and each of the pixel units comprises the first transistor, the second transistor, the pixel electrode, and the common electrode, wherein the source and the drain of the first transistor are electrically connected between the pixel electrode and the data line, and the source and the drain of the second transistor are electrically connected between the common electrode and the common line; the pixel electrode generates the first feed-through voltage when the first transistor is changed from the on state to the off state; and the common electrode generates the second feed-through voltage when the second transistor is changed from the on state to the off state. The display panel control method comprises compensating for the display voltage corresponding to each of the plurality of pixel units based on the difference between the first feed-through voltage and the second feed-through voltage of the pixel unit, to improve the problem such as the flicker or the image sticking in the display picture due to the unevenness of the feed-through voltages.

EMBODIMENTS OF THE PRESENT DISCLOSURE

To make the objectives, technical solutions, and effects of the present application more clear and definite, the present application is illustrated in detail below by referring to the accompanying drawings and illustrating the embodiments. It should be understood that the specific implementations described here are only used to explain the present application, and are not used to limit the present application.

Figure 1:
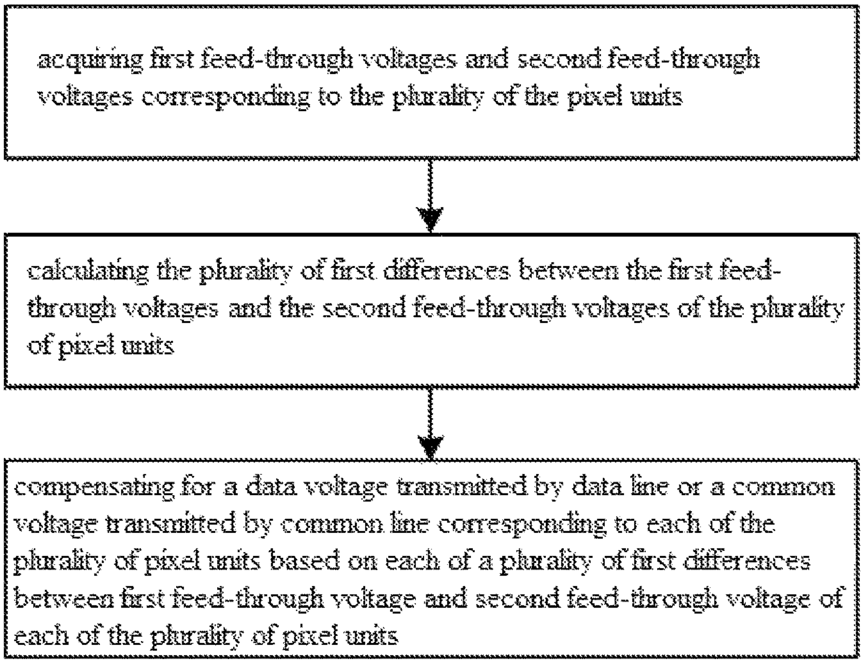
FIG. 1 is a flowchart of a display panel control method according to an embodiment of the present application.
Figure 2:
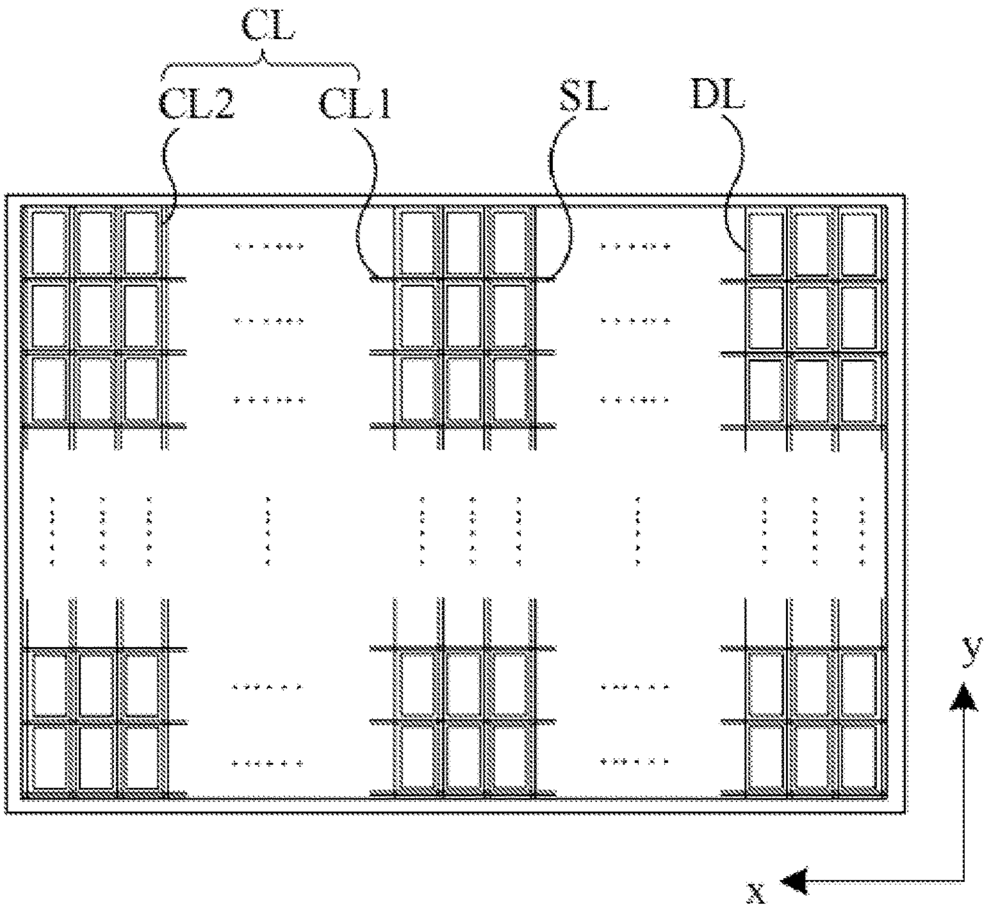
FIG. 2 is a schematic structural diagram of a display panel according to an embodiment of the present application.

Specifically, FIG. 1 is a flowchart of a display panel control method according to an embodiment of the present application, and FIG. 2 is a schematic structural diagram of a display panel according to an embodiment of the present application. An embodiment of the present application provide a display panel control method for controlling the display panel to realize display, so as to improve the problem such as flicker or the image sticking in the display picture due to the unevenness of the feed-through voltages.

Specifically, referring to FIG. 2, the display panel includes a plurality of data lines DL, a plurality of scanning lines SL, a plurality of common lines CL, and a plurality of pixel units.

The plurality of data lines DL are arranged in a first direction x and extended in a second direction y, and the plurality of data lines DL transmit a plurality of data voltages $V_{pixel}$. The first direction x intersects the second direction y.

The plurality of scanning lines SL are arranged in the second direction y and extended in the first direction x, and the plurality of data lines SL transmit a plurality of scanning signals.

The plurality of common lines CL transmit common voltages $V_{com}$. Optionally, the plurality of common lines CL includes a plurality of first common lines CL1 and a plurality of second common lines CL2, where the plurality of first common lines CL1 are disposed parallel with and spaced apart from the scanning line SL, and the plurality of second common lines CL2 are disposed in parallel with and spaced apart from the data lines DL.

Figure 3:
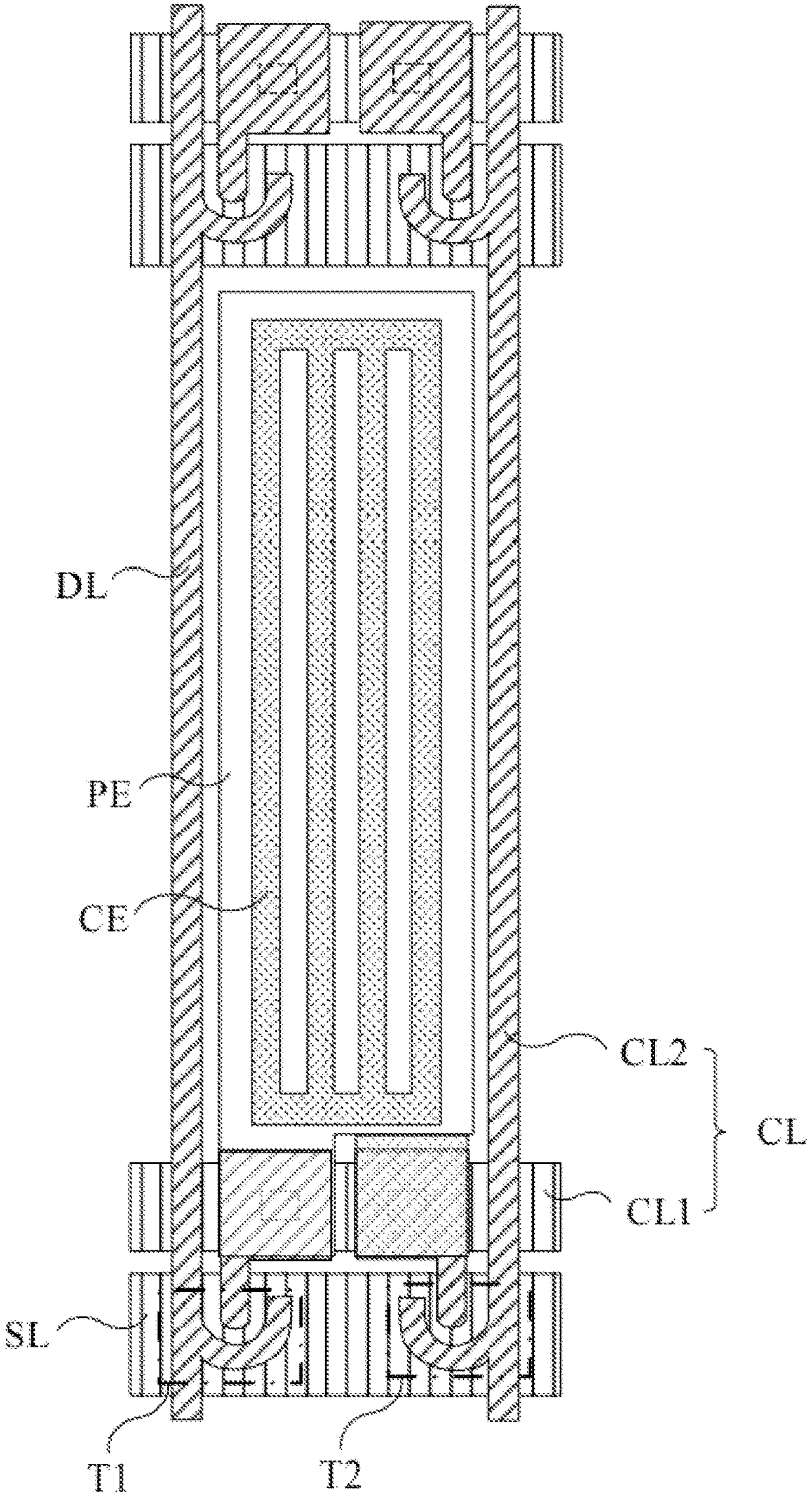
FIG. 3 is a schematic structural diagram of a pixel unit according to an embodiment of the present application.

The plurality of pixel units are defined by intersecting the plurality of data lines DL with the plurality of scanning lines DL. FIG. 3 is a schematic structural diagram of a pixel unit according to an embodiment of the present application. The pixel unit is defined by the data line DL, the first common line CL1, the scanning lines SL, and the second common line CL2.

The pixel unit includes a first transistor T1, a second transistor T2, a pixel electrode PE, a common electrode CE, a liquid crystal capacitor $C_{lc}$, a storage capacitor $C_{st}$, and a liquid crystal layer.

Optionally, a source and a drain of the first transistor T1 are electrically connected between the pixel electrode PE and the corresponding data line of the data lines, a source and a drain of the second transistor T2 are electrically connected between the common electrode CE and the corresponding common line of the common lines CL, a gate of the first transistor T1 is electrically connected to the corresponding scanning line of the scanning lines SL, and the gate of the second transistor T2 is electrically connected to corresponding scanning line of the scanning lines SL. Optionally, the source and drain of the second transistor T2 are electrically connected between the common electrode CE and the corresponding first common line of the first common lines CL1. Optionally, the first common line CL1 is adjacent to the first transistor T1 and the second transistor T2, and the second common line CL2 is adjacent to the second transistor T2.

The liquid crystal capacitor $C_{lc}$ is constituted by the pixel electrode PE, the common electrode CE, and the liquid crystal layer.

The storage capacitor $C_{st}$ is connected in parallel with the liquid crystal capacitor $C_{lc}$. Specifically, the storage capacitor $C_{st}$ is connected in series between one of the source and the drain of the first transistor T1 electrically connected to the pixel electrode PE and one of the source and the drain of the second transistor T2 electrically connected to the common electrode CE. Optionally, both electrodes of the storage capacitor $C_{st}$ are constituted by the second common line CL2 and the pixel electrode PE, respectively.

The pixel electrode PE generates a first feed-through voltage $V_{FT1}$ when the first transistor T1 is changed from an on state to an off state in response to a scanning signal transmitted by a corresponding scanning line of the scanning lines SL, and the common electrode CE generates a second feed-through voltage $V_{FT2}$ when the second transistor T2 is changed from the on state to the off state in response to a scanning signal transmitted by a corresponding scanning line of the scanning lines SL. However, since parasitic capacitances are generated between any two of the pixel electrode PE, the data line DL, the common line CL, the scanning lines SL, and the common electrode CE (for example, a parasitic capacitance $C_{PD}$ is generated between the pixel electrode PE and the data line DL adjacent to the pixel electrode PE, and a parasitic capacitance $C_{PG}$ is generated between the pixel electrode PE and the scanning line SL adjacent to the pixel electrode PE, or the like), the first feed-through voltage $V_{FT1}$ is not exactly equal to the second feed-through voltage $V_{FT2}$ under the influence of the parasitic capacitances generated between any two of the pixel electrode PE, the data line DL, the common line CL, the scanning lines SL, and the common electrode CE, which causes problems such as the flicker or the image sticking in the display picture.

In addition, even if the first transistor T1 and the second transistor T2 have the same type (for example, the first transistor T1 and the second transistor T2 are both P-type transistors or both N-type transistors, and both the first transistor T1 and the second transistor T2 are both silicon transistors or both oxide transistors), the parasitic capacitance between the scanning line SL electrically connected to the gate of the first transistor T1 and the pixel electrode PE is not equal to the parasitic capacitance between the scanning line SL electrically connected to the gate of the second transistor T2 and the common electrode CE due to the influence of the process factor. Therefore, when the first transistor T1 and the second transistor T2 are changed from the on state to the off state in response to the scanning signal transmitted by the respective scanning line SL, the first feed-through voltage $V_{FT1}$ is not exactly equal to the second feed-through voltage $V_{FT2}$, which also causes problems such as the flicker or the image sticking in the display picture.

In order to solve the problems such as the flicker or the image sticking in the display picture due to the first and second feed-through voltages $V_{FT1}$ and $V_{FT2}$ being not exactly equal to each other (i.e., the feed-through voltages are uneven), the display panel control method provided by the embodiment of the present application includes:

compensating for a display voltage $V_d$ corresponding to each of the plurality of pixel units based on a difference between the first feed-through voltage $V_{FT1}$ and the second feed-through voltage $V_{FT2}$ of the pixel unit.

Specifically, since each of the pixel units correspondingly has the first feed-through voltage $V_{FT1}$ and the second feed-through voltage $V_{FT2}$, the plurality of pixel units correspondingly have a plurality of first feed-through voltage $V_{FT1}$ and a plurality of second feed-through voltage $V_{FT2}$, and each of the pixel units compensates for a display voltage $V_d$ corresponding to the pixel unit based on a difference between the first feed-through voltage $V_{FT1}$ and the second feed-through voltage $V_{FT2}$ corresponding to the pixel unit.

Optionally, at least one of the pixel units compensates for the display voltage $V_d$ corresponding to the pixel unit based on a difference between the first feed-through voltage $V_{FT1}$ and the second feed-through voltage $V_{FT2}$, or a ratio therebetween, or a product therebetween, or a sum therebetween.

Since the display voltage $V_d$ is equal to the difference between the data voltage $V_{pixel}$ and the common voltage $V_{com}$, the step of compensating for a display voltage $V_d$ corresponding to each of the plurality of pixel units based on a difference between the first feed-through voltage $V_{FT1}$ and the second feed-through voltage $V_{FT2}$ of the pixel unit includes:

compensating the data voltage $V_{pixel}$ transmitted by the data line DL and/or the common voltage $V_{com}$ transmitted by the common line CL corresponding to each of the plurality of pixel units based on a plurality of first differences X between the first feed-through voltage $V_{FT1}$ and the second feed-through voltage $V_{FT2}$ of each of the plurality of pixel units. The compensation for the display voltage $V_d$ is achieved by compensating for the data voltage $V_{pixel}$ and/or the common voltage $V_{com}$.

Optionally, the plurality of first difference X between each of the first feed-through voltages $V_{FT1}$ and corresponding one of the second feed-through voltages $V_{FT2}$ of the plurality of pixel units are stored by a storage module to enable the driving module to generate the common voltage $V_{com}$ and/or the plurality of data voltages $V_{pixel}$ based on the plurality of first differences X to compensate for the display voltage $V_d$ corresponding to each of the plurality of pixel units when the driving module drives the display panel to perform a display operation. The driving module is electrically connected to the plurality of data lines DL and the plurality of common lines CL.

Optionally, before the step of compensating for the data voltage $V_{pixel}$ transmitted by the data line DL and/or the common voltage $V_{com}$ transmitted by the common line CL corresponding to each of the plurality of pixel units based on a plurality of first differences X between the first feed-through voltage $V_{FT1}$ and the second feed-through voltage $V_{FT2}$ of each of the plurality of pixel units, the control method further includes:

acquiring the first feed-through voltages $V_{FT1}$ and the second feed-through voltages $V_{FT2}$ corresponding to the plurality of pixel units; and calculating the plurality of first differences X between the first feed-through voltages $V_{FT1}$ and the second feed-through voltages $V_{FT2}$ of the plurality of pixel units.

The first feed-through voltage $V_{FT1}$, the second feed-through voltage $V_{FT2}$, and the first difference value X corresponding to each of the pixel units can be calculated according to the following formulas:

$$V_{FT1}=C_{GD1}/(C_{lc}+C_{st}+C_{GD1}+C_{su})*\Delta V_{G1};$$

$$V_{FT2}=C_{GD2}/(C_{lc}+C_{st}+C_{GD2}+C_{su})*\Delta V_{G2}; \text{ and}$$

$$X=V_{FT1}-V_{FT2}.$$

wherein $C_{GD1}$ represents a parasitic capacitance between a scanning line SL electrically connected to the first transistor T1 and the pixel electrode PE, and $C_{GD2}$ represents a parasitic capacitance between a scanning line SL electrically connected to the second transistor T2 and the common electrode CE; $\Delta V_{G1}$ represents a voltage change amount on the scanning line SL electrically connected to the first transistor T1, and $\Delta V_{G2}$ represents a voltage change amount on the scanning line SL electrically connected to the second transistor T2; and $C_{su}$ represents a sum of remaining of a plurality of parasitic capacitance generated between any two of the pixel electrode PE, the data line DL, the common line CL, the scanning line SL, and the common electrode CE other than $C_{GD1}$ and $C_{GD2}$ (e.g., a sum of a parasitic capacitance $C_{PD}$ between the pixel electrode PE and the data line DL adjacent to the pixel electrode PE and a parasitic capacitance $C_{PG}$ between the pixel electrode PE and the scanning line SL adjacent to the pixel electrode PE, and the like).

Optionally, the acquired first feed-through voltages $V_{FT1}$ and the acquired second feed-through voltages $V_{FT2}$ corresponding to the plurality of pixel units can be stored into the storage module.

Optionally, the driving module includes a control chip that can calculate a plurality of first difference X from the plurality of first feed-through voltages $V_{FT1}$ and the plurality of second feed-through voltages $V_{FT2}$, and compensate for the data voltages $V_{pixel}$ or the common voltage $V_{com}$ from the plurality of first difference X.

Optionally, the acquired first feed-through voltages $V_{FT1}$ and the acquired second feed-through voltages $V_{FT2}$ corresponding to the plurality of pixel units can also be directly transmitted to the control chip, and after the control chip calculates the plurality of first difference values X therefrom, the plurality of first difference value X are stored into the storage module.

Since a size, a shape, a relative position, and the like of the plurality of first transistors T1, the plurality of second transistors T2, the plurality of data lines DL, the plurality of scanning lines SL, and the plurality of common lines CL have been determined after the display panel has been prepared, the plurality of parasitic capacitances generated between any two of the pixel electrode PE, the data line DL, the common line CL, the scanning line SL, and the common electrode CE are determined. Therefore, the plurality of first difference value X may be statically stored in the storage module without performing a plurality of storage operations while a display frequency of the display panel being changed.

Optionally, the driving module includes a timing controller, where the timing controller includes the control chip and the storage module.

Optionally, the driving module further includes a power management chip electrically connected to the timing controller, where the timing controller compensates for an output signal of the power management chip based on the first difference X to compensate for the display voltage $V_d$ corresponding to each of the plurality of pixel units.

First, compensation for the data voltage $V_{pixel}$ is taken for an example. The driving module further includes a source driving chip electrically connected to both the power management chip and the plurality of data lines DL, where the source driving chip outputs the plurality of data voltages $V_{pixel}$ to the plurality of data lines DL based on the output signal of the power management chip, so that each of the data voltages $V_{pixel}$ includes information of the first difference X corresponding to the pixel unit (i.e., $V_{pixel}=V_{p0}+X$; where $V_{p0}$ represents a data voltage obtained by the source driving chip from an output signal of the power management chip before the first difference value X is not compensated for). Since the second transistor T2 is changed from the on state to the off state, the voltage change amount generated on the pixel electrode PE is equal to the first difference X under the influence of a capacitive coupling effect. As a result, the data voltage $V_{pixel}$ is changed from $V_{pixel}=V_{p0}+X$ to $V_{pixel}=V_{p0}+X-X=V_{p0}$, so that the data voltage $V_{pixel}$ is compensated for, and thus the display voltage $V_d$ is also compensated for.

Since the voltage applied to the liquid crystal layer is large and the liquid crystal capacitance $C_{lc}$ is increased when the gray scale level of the display voltage $V_d$ before compensation is a high gray scale level, the first difference value X may be reduced when the gray scale level of the display voltage $V_d$ before compensation is a high gray scale level. Since the voltage applied to the liquid crystal layer is small and the liquid crystal capacitance $C_{lc}$ is reduced when the gray scale level of the display voltage $V_d$ before compensation is a low gray scale level, the first difference value X can be increased when the grays scale level of the display voltage $V_d$ before compensation is a low gray scale level. That is, the gray scale level corresponding to the display voltage $V_d$ before compensation is inversely proportional to the first difference X.

Each of the pixel units has a plurality of first difference when being corresponding to a plurality of gray scale levels, and the number of the first difference that each of the pixel units can have when being corresponding to a plurality of gray scale levels is less than or equal to the number of gray scale levels of the display panel. That is, the number of the first difference values corresponding to each of the pixel units having different values is less than or equal to the number of gray scale levels of the display panel. It is assumed that the number of the gray scale levels of the display panel is 256, the number of the first difference values corresponding to each of the pixel units having different values is less than or equal to 256. Specifically, each of the pixel units has a different first difference X when being corresponding to a different gray scale level, or each of the pixel units has a same first difference X when being corresponding to a different gray scale level (for example, the gray scale levels can be grouped according to actual requirements (for example, every 8 or 16 gray scale levels are grouped into a group), and each group of gray scale levels corresponds to one of the first differences X).

If each of the pixel units has different first difference values X when being corresponding to different gray scale levels, since the gray scale levels and the first difference values X of the pixel unit are in a one-to-one correspondence relationship, the display effect of each of the pixel units can be more accurately improved.

Compensation for the common voltage $V_{com}$ is taken for an example. The plurality of common lines CL are electrically connected to the power management chip, and the power management chip outputs the common voltages $V_{com}$ to the plurality of common lines CL so that each of the common voltages $V_{com}$ includes information of the first difference X corresponding to the pixel unit (i.e., where $V_{com}=V_{c0}+X$; $V_{c0}$ represents a common voltage output by the power management chip to the common line CL before the first difference X is compensated for). Since the second transistor T2 is changed from the on state to the off state, the voltage change amount generated on the pixel electrode PE is equal to the first difference X under the influence of the capacitive coupling effect. As a result, the data voltage is $V_{pixel}=V_{p0}+X$, so that the display voltage is $V_d=V_{pixel}-V_{com}=V_{p0}+X-V_{c0}-X$, and thus the display voltage $V_d$ is compensated for.

Alternatively, the plurality of common voltages $V_{com}$ transmitted by the plurality of common lines CL are all the same. Further, since each of the pixel units has a different first difference X when being corresponding to a different gray scale level, the common voltage $V_{com}$ may be determined according to a maximum value and a minimum value among the plurality of first difference values X so that the same common voltage $V_{com}$ transmitted by the plurality of common lines CL can compensate for the display voltage $V_d$ when the plurality of pixel units have a plurality of first difference values X. Specifically, the plurality of pixel units have the plurality of first differences X when being corresponding to the plurality of gray scale levels, where the plurality of first differences X have a first maximum difference $X_{max}$ and a first minimum difference $X_{min}$, and the common voltage $V_{com}$ is equal to an average value of the first maximum difference $X_{max}$ and the first minimum difference $X_{min}$, that is, $V_{com}=(X_{max}+X_{min})/2$.

Since the common voltage $V_{com}$ is equal to the average value of the first maximum difference $X_{max}$ and the first minimum difference $X_{min}$ when the plurality of common voltages $V_{com}$ transmitted by the plurality of common lines CL are all the same, compensation for the common voltage $V_{com}$ can only achieve compensation for the display voltage $V_d$ to some extent. For this, it is also possible to compensate for the data voltage $V_{pixel}$ on the basis of compensation for the common voltage $V_{com}$ in order to fully compensate for the display voltage $V_d$. For example, after the common voltage $V_{com}$ is individually compensated for, the first difference value X of each of a plurality of pixel units is calculated again, and the data voltage $V_{pixel}$ is compensated for according to a plurality of first difference values X calculated again, thereby achieving full compensation for the display voltage $V_d$. The principle of compensating for the data voltage $V_{pixel}$ can be obtained on the basis of compensating for the common voltage $V_{com}$ with reference to the foregoing principle of compensating for the common voltage $V_{com}$ and the data voltage $V_{pixel}$.

Optionally, the gate of the first transistor T1 and the gate of the second transistor T2 are electrically connected to the same scanning line SL; or the gate of the first transistor T1 and the gate of the second transistor T2 are electrically connected to the different scanning lines SL.

Figure 4:
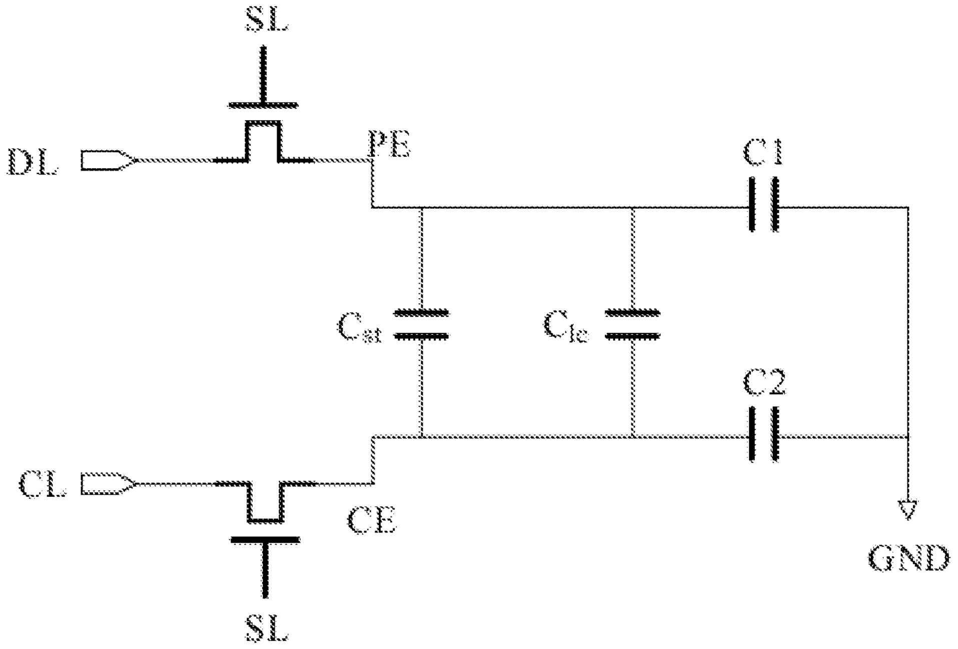
FIG. 4 is an equivalent circuit diagram of a pixel unit according to an embodiment of the present application.

Optionally, the pixel unit further includes a first capacitor C1 and a second capacitor C2. Specifically, FIG. 4 is an equivalent circuit diagram of a pixel unit according to an embodiment of the present application. The first capacitor C1 is connected in series between one of the source or the drain of the first transistor T1 electrically connected to the pixel electrode PE and a first voltage terminal GND, and the second capacitor C2 is connected in series between one of the source and the drain of the second transistor T2 electrically connected to the common electrode CE and the first voltage terminal GND. Optionally, the first voltage terminal GND is a ground terminal.

When the scanning signal transmitted by the scanning line SL electrically connected to the gates of the first transistor T1 and the second transistor T2 is active, the first transistor T1 and the second transistor T2 are turned on, so that the data line DL transmits the data voltage $V_{pixel}$ to the pixel electrode PE via the first transistor T1, and the first common line CL1 transmits the common voltage $V_{com}$ to the common electrode CE via the second transistor T2.

Figure 5:
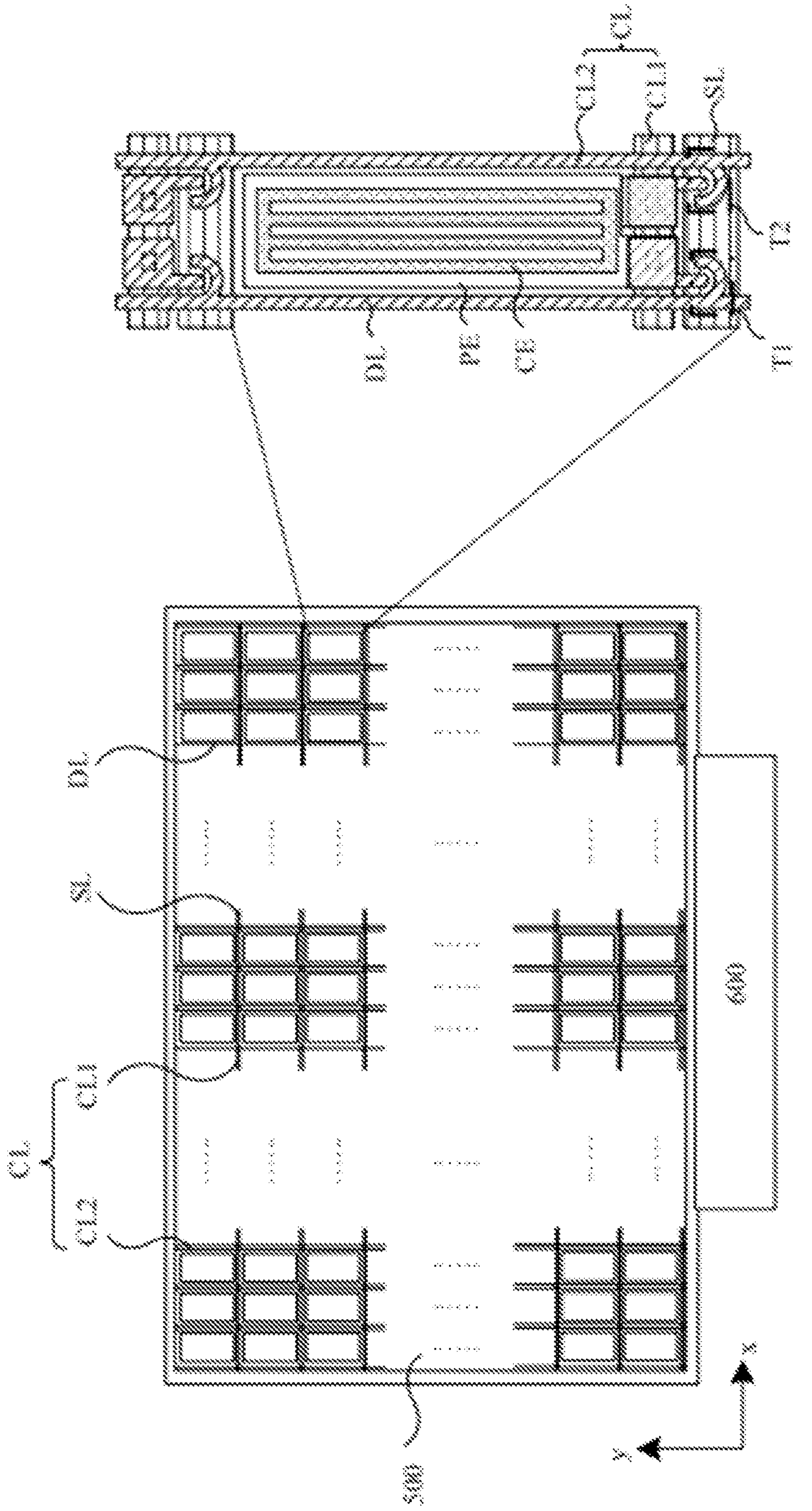
FIG. 5 is a schematic structural diagram of a display module according to an embodiment of the present application.

FIG. 5 is a schematic structural diagram of a display module according to an embodiment of the present application. An embodiment of the present application further provides a display module, including a display panel 500 and a driving module 600 electrically connected to the display panel 500. The display panel 500 includes a plurality of data lines DL, a plurality of scanning lines SL, a plurality of common lines CL, and a plurality of pixel units.

The plurality of data lines DL are arranged in a first direction x and extended in a second direction y, and the plurality of data lines DL transmit a plurality of data voltages $V_{pixel}$. The first direction X is configured to intersect the second direction Y.

The plurality of scanning lines SL are arranged in the second direction y and extended in the first direction x, and the plurality of data lines SL transmit a plurality of scanning signals.

The plurality of common lines CL transmit a common voltage $V_{com}$. Optionally, the plurality of common lines CL includes a plurality of first common lines CL1 and a plurality of second common lines CL2, where the plurality of first common lines CL1 are disposed parallel with and spaced apart from the scanning line SL, and the plurality of second common lines CL2 are disposed in parallel with and spaced apart from the data lines DL.

The plurality of pixel units are defined by intersecting the plurality of data lines DL with the plurality of scanning lines DL. Optionally, the scanning line SL and the first common line CL1 are disposed on opposite sides of the pixel unit, and the data line DL and the second common line CL2 are disposed on opposite sides of the pixel unit.

Each of the pixel units includes a first transistor T1, a second transistor T2, a pixel electrode PE, a common electrode CE, a liquid crystal capacitor, a storage capacitor, and a liquid crystal layer. A source and a drain of the first transistor T1 are electrically connected between the pixel electrode PE and the data line DL, a source and a drain of the second transistor T2 are electrically connected between the common electrode CE and the common line CL. A gate of the first transistor T1 is electrically connected to the corresponding scanning line of the scanning lines SL, and the gate of the second transistor T2 is electrically connected to corresponding scanning line of the scanning lines SL. Optionally, the source and drain of the second transistor T2 are electrically connected between the common electrode CE and the corresponding first common line of the first common lines CL1. Optionally, the first common line CL1 is adjacent to the first transistor T1 and the second transistor T2, and the second common line CL2 is adjacent to the second transistor T2. Alternatively, the gate of the first transistor T1 and the gate of the second transistor T2 are electrically connected to the same scanning line SL.

The liquid crystal capacitor is constituted by the pixel electrode PE, the common electrode CE, and the liquid crystal layer. The storage capacitor is connected in parallel with the liquid crystal capacitor. Alternatively, the storage capacitor is connected in series between one of the source and the drain of the first transistor T1 electrically connected to the pixel electrode PE and one of the source and the drain of the second transistor T2 electrically connected to the common electrode CE. Optionally, both electrodes of the storage capacitor are constituted by the second common line CL2 and the pixel electrode PE, respectively.

The pixel electrode PE generates a first feed-through voltage $V_{FT1}$ when the first transistor T1 is changed from an on state to an off state in response to a scanning signal transmitted by a corresponding scanning line of the scanning lines SL, and the common electrode CE generates a second feed-through voltage $V_{FT2}$ when the second transistor T2 is changed from the on state to the off state in response to a scanning signal transmitted by a corresponding scanning line of the scanning lines SL. However, since parasitic capacitances are generated between any two of the pixel electrode PE, the data line DL, the common line CL, the scanning lines SL, and the common electrode CE, the first feed-through voltage $V_{FT1}$ is not exactly equal to the second feed-through voltage $V_{FT2}$ under the influence of the parasitic capacitances, which causes problems such as the flicker or the image sticking in the display picture. In addition, even if the first transistor T1 and the second transistor T2 have the same type, the parasitic capacitance between the scanning line SL electrically connected to the gate of the first transistor T1 and the pixel electrode PE is not equal to the parasitic capacitance between the scanning line SL electrically connected to the gate of the second transistor T2 and the common electrode CE due to the influence of the process factor. Therefore, when the first transistor T1 and the second transistor T2 are changed from the on state to the off state in response to the scanning signal transmitted by the respective scanning line SL, the first feed-through voltage $V_{FT1}$ is not exactly equal to the second feed-through voltage $V_{FT2}$, which also causes problems such as the flicker or the image sticking in the display picture.

In order to solve the problems such as the flicker or the image sticking in the display picture due to the first and second feed-through voltages $V_{FT1}$ and $V_{FT2}$ being not exactly equal (i.e., the feed-through voltages are uneven), the driving module 600 compensates for a display voltage $V_d$ corresponding to respective pixel unit of the plurality of pixel units based on a difference between the first feed-through voltage $V_{FT1}$ and the second feed-through voltage $V_{FT2}$ of the pixel unit.

Optionally, a first difference exists between the first feed-through voltage $V_{FT1}$ and the second feed-through voltage $V_{FT2}$ of each of the pixel units, and the driving module 600 compensates for a display voltage $V_d$ corresponding to respective pixel unit of the plurality of pixel units based on the first difference X of the pixel unit.

Optionally, the driving module 600 further includes a timing controller and a power management chip electrically connected to the timing controller, where the timing controller compensates for an output signal of the power management chip based on the first difference X to compensate for the display voltage $V_d$ corresponding to each of the plurality of pixel units.

Since the display voltage $V_d$ is equal to the difference between the data voltage $V_{pixel}$ and the common voltage $V_{com}$, the driving module 600 further includes the source driving chip electrically connected to both the power management chip and the plurality of data lines DL, and the source driving chip outputs the plurality of data voltages $V_{pixel}$ to the plurality of data lines DL based on the output signal of the power management chip, so as to realize compensation for the display voltage $V_d$; or the plurality of common lines CL are electrically connected to the power management chip, and the power management chip outputs the common voltage $V_{com}$ to the plurality of common lines CL, to compensate for the display voltage $V_d$ corresponding to each of the plurality of pixel units.

In compensating for the plurality of data voltages $V_{pixel}$ to achieve compensation for the display voltage $V_d$, since the voltage applied to the liquid crystal layer is large and the liquid crystal capacitance $C_{lc}$ is increased when the gray scale level of the display voltage $V_d$ before compensation is a high gray scale level, the first difference value X may be reduced when the gray scale level of the display voltage $V_d$ before compensation is a high gray scale level. Since the voltage applied to the liquid crystal layer is small and the liquid crystal capacitance $C_{1c}$ is reduced when the gray scale level of the display voltage $V_d$ before compensation is a low gray scale level, the first difference value X can be increased when the grays scale level of the display voltage $V_d$ before compensation is a low gray scale level. That is, the gray scale level corresponding to the display voltage $V_d$ before compensation is inversely proportional to the first difference X. Each of the pixel units has a plurality of first differences when being corresponding to a plurality of gray scale levels, and the number of the first differences that each of the pixel units can have when being corresponding to a plurality of gray scale levels is less than or equal to the number of gray scale levels of the display panel 500.

In compensating for the common voltage $V_{com}$ to achieve compensation for the display voltage $V_d$ corresponding to the plurality of pixel units, the plurality of pixel units have the plurality of first differences X when being corresponding to the plurality of gray scale levels, where the plurality of first differences X have a first maximum difference $X_{max}$ and a first minimum difference $X_{min}$, and the common voltage $V_{com}$ is equal to an average value of the first maximum difference $X_{max}$ and the first minimum difference $X_{min}$, that is, $V_{com}=(X_{max}+X_{min})/2$.

Optionally, Since the common voltage $V_{com}$ is equal to the average value of the first maximum difference $X_{max}$ and the first minimum difference $X_{min}$, compensation for the common voltage $V_{com}$ can only achieve compensation for the display voltage $V_d$ to some extent. For this, it is also possible to compensate for the data voltage $V_{pixel}$ on the basis of compensation for the common voltage $V_{com}$ in order to fully compensate for the display voltage $V_d$. For example, after the common voltage $V_{com}$ is individually compensated for, the first difference value X of each of a plurality of pixel units is calculated again, and the data voltage $V_{pixel}$ is compensated for according to a plurality of first difference values X calculated again, thereby achieving full compensation for the display voltage $V_d$.

Optionally, the pixel unit further includes a first capacitor and a second capacitor. The first capacitor is connected in series between one of the source or the drain of the first transistor T1 electrically connected to the pixel electrode PE and a first voltage terminal, and the second capacitor is connected in series between one of the source and the drain of the second transistor T2 electrically connected to the common electrode CE and the first voltage terminal. Optionally, the first voltage terminal is a ground terminal.

An embodiment of the present application further provides a display device including the display module according to any one of the foregoing embodiments.

As can be understood, the display device includes a movable display device (e.g., a notebook computer, a mobile phone, etc.), a fixed terminal (e.g., a desktop computer, a television, etc.), a measuring device (e.g., a sport bracelet, a thermometer, etc.), or the like.

A specific example is used herein to describe a principle and an implementation of the present application. The description of the foregoing embodiments is merely used to help understand a method and a core idea of the present application. In addition, a person skilled in the art may make changes in a specific implementation manner and an application scope according to an idea of the present application. In conclusion, content of this specification should not be construed as a limitation on the present application.

What is claimed is:

1. A display panel control method, wherein, the display panel comprises a plurality of data lines, a plurality of common lines, and a plurality of pixel units, wherein each of the pixel units comprises a first transistor, a second transistor, a pixel electrode, and a common electrode, wherein a source and a drain of the first transistor are electrically connected between the pixel electrode and the data line, and a source and a drain of the second transistor are electrically connected between the common electrode and the common line; the pixel electrode generates a first feed-through voltage when the first transistor is changed from an on state to an off state; and the common electrode generates a second feed-through voltage when the second transistor is changed from the on state to the off state; wherein the control method comprises:

compensating for a display voltage corresponding to each of the plurality of pixel units based on a difference between the first feed-through voltage and the second feed-through voltage of the pixel unit, comprising:

compensating for a data voltage transmitted by the data line or a common voltage transmitted by the common line corresponding to each of the plurality of pixel units based on each of a plurality of first differences between the first feed-through voltage and the second feed-through voltage of each of the plurality of pixel units.

2. The control method of claim 1, wherein before compensating for a data voltage transmitted by the data line or a common voltage transmitted by the common line corresponding to each of the plurality of pixel units based on each of a plurality of first differences between the first feed-through voltage and the second feed-through voltage of each of the plurality of pixel units, further comprising:

acquiring the first feed-through voltages and the second feed-through voltages corresponding to the plurality of pixel units; and calculating the plurality of first differences between the first feed-through voltages and the second feed-through voltages of the plurality of pixel units.

3. The control method of claim 2, wherein:

a calculation formula of the first feed-through voltage is: $V_{FT1}=C_{GD1}/(C_{lc}+C_{st}+C_{GD1}+C_{su})*\Delta V_{G1}$;

a calculation formula of the second feed-through voltage is: $V_{FT2}=C_{GD2}/(C_{lc}+C_{st}+C_{GD2}+C_{su})*\Delta V_{G2}$; and a calculation formula of the first difference is: $X=V_{FT1}-V_{FT2}$;

wherein $C_{GD1}$ represents a parasitic capacitance between a scanning line electrically connected to the first transistor and the pixel electrode, and $C_{GD2}$ represents a parasitic capacitance between a scanning line electrically connected to the second transistor and the common electrode; $\Delta V_{G1}$ represents a voltage change amount on the scanning line electrically connected to the first transistor, and $\Delta V_{G2}$ represents a voltage change amount on the scanning line electrically connected to the second transistor; and $C_{su}$ represents a sum of remaining of a plurality of parasitic capacitance generated between any two of the pixel electrode, the data line, the common line, the scanning line, and the common electrode other than $C_{GD1}$ and $C_{GD2}$.

4. A display module, comprising a display panel and a driving module electrically connected to the display panel, wherein the display panel comprises:

a plurality of data lines;

a plurality of common lines; and a plurality of pixel units, wherein each of the pixel units comprises a first transistor, a second transistor, a pixel electrode, and a common electrode, wherein a source and a drain of the first transistor are electrically connected between the pixel electrode and the data line, and a source and a drain of the second transistor are electrically connected between the common electrode and the common line; the pixel electrode generates a first feed-through voltage when the first transistor is changed from an on state to an off state; and the common electrode generates a second feed-through voltage when the second transistor is changed from the on state to the off state;

wherein the driving module is electrically connected to the plurality of data lines and the plurality of common lines, and configured to compensate for a display voltage corresponding to each of the plurality of pixel units based on a difference between the first feed-through voltage and the second feed-through voltage of the pixel unit;

wherein a first difference exists between the first feed-through voltage and the second feed-through voltage, and the driving module compensates for the display voltage corresponding to respective pixel unit of the plurality of pixel units based on the first difference of the pixel unit.

5. The display panel of claim 4, wherein the driving module comprises a timing controller and a power management chip electrically connected to the timing controller, wherein the timing controller compensates for an output signal of the power management chip based on the first difference to compensate for the display voltage corresponding to respective pixel unit of the plurality of pixel units.

6. The display panel of claim 5, wherein the display voltage comprises a data voltage, and the driving module further comprises a source driving chip electrically connected to both the power management chip and the plurality of data lines, wherein the source driving chip outputs a plurality of data voltage to the plurality of data lines based on the output signal of the power management chip.

7. The display panel of claim 6, wherein a gray scale level corresponding to the display voltage before compensation is inversely proportional to the first difference.

8. The display panel of claim 6, wherein each of the pixel units has a plurality of first difference when being corresponding to a plurality of gray scale levels, and the number of the first difference having different values is less than or equal to the number of gray scale levels of the display panel.

9. The display panel of claim 5, wherein the display voltage comprises a common voltage, and the plurality of common lines are electrically connected to the power management chip, wherein the power management chip outputs a common voltage to each of the plurality of common lines.

10. The display panel of claim 9, wherein the plurality of pixel units have a plurality of first differences when being corresponding to a plurality of gray scale levels, and the plurality of first differences have a first maximum difference and a first minimum difference;

wherein, the common voltage is equal to an average of the first maximum difference and the first minimum difference.

11. The display panel of claim 5, wherein the timing controller comprises a storage module configured to store a plurality of first differences.

12. The display panel of claim 4, wherein the pixel unit further comprises a liquid crystal capacitor, a storage capacitor, and a liquid crystal layer, wherein the liquid crystal capacitor is constituted by the pixel electrode, the common electrode, and the liquid crystal layer; the storage capacitor is connected in parallel with the liquid crystal capacitor, and the storage capacitor is connected in series between one of a source and a drain of the first transistor electrically connected to the pixel electrode and one of a source and a drain of the second transistor electrically connected to the common electrode.

13. The display panel of claim 12, wherein both electrodes of the storage capacitor are constituted by a second common line and the pixel electrode, respectively.

14. The display panel of claim 13, wherein the plurality of common lines comprise a plurality of first common lines and a plurality of second common lines, wherein the plurality of first common lines are disposed in parallel with and spaced apart from the scanning lines, and the plurality of second common lines are disposed in parallel with and spaced apart from the data lines.

15. The display panel of claim 4, wherein the pixel unit further comprises a first capacitor and a second capacitor, wherein the first capacitor is connected in series between one of a source or a drain of the first transistor electrically connected to the pixel electrode and a first voltage terminal, and the second capacitor is connected in series between one of a source or a drain of the second transistor electrically connected to the common electrode and the first voltage terminal.

16. The display panel of claim 4, wherein the display panel further comprises a plurality of scanning lines, wherein a gate of the first transistor and a gate of the second transistor of the same pixel unit are electrically connected to the same scanning line.

* * * * *